United States Patent [19]

Faulstich et al.

[11] 4,343,908

[45] Aug. 10, 1982

[54] OPTICAL GLASS HAVING $n_D=1.63\pm(1.5\times10^{-2})$, $v_D=59.5\pm1.0$ WITH A HIGH CHEMICAL STABILITY AND A LOW TENDENCY TO CRYSTALLIZATION

[75] Inventors: Marga Faulstich, Mainz; Volmar Geiler, Mainz-Finthen, both of Fed. Rep. of Germany

[73] Assignee: Schott Glaswerke, Mains, Fed. Rep. of Germany

[21] Appl. No.: 221,110

[22] Filed: Dec. 29, 1980

[30] Foreign Application Priority Data

Dec. 29, 1979 [DE] Fed. Rep. of Germany ....... 2952705

[51] Int. Cl.³ ............................................... C03C 3/08
[52] U.S. Cl. ...................................... 501/78; 501/903
[58] Field of Search ............... 106/47 Q, 54; 501/78, 501/903

[56] References Cited

U.S. PATENT DOCUMENTS

| | | | |
|---|---|---|---|
| 3,248,238 | 4/1966 | Faulstich | 106/54 |
| 3,529,980 | 9/1970 | Brömer et al. | 106/47 Q |
| 3,898,093 | 8/1975 | Faulstich et al. | 106/54 |
| 3,970,466 | 7/1976 | Faulstich | 106/47 Q |

FOREIGN PATENT DOCUMENTS 54-003115 1/1979 Japan ............................... 106/47 Q

*Primary Examiner*—Mark Bell
*Attorney, Agent, or Firm*—Millen & White

[57] ABSTRACT

An optical glass having $n_D=1.63\pm(1.5\times10^{-2})$, $v_D=59.5\pm1.0$, a high chemical stability and a low tendency to crystallization is provided, consisting essentially of (in percent. by weight):

| | |
|---|---|
| $SiO_2$ | 23-27 |
| $B_2O_3$ | 24-30 |
| SrO | 18-31 |
| $La_2O_3$ | 10-16 |
| $Al_2O_3$ | 2-4 |
| BaO | 0-10 |
| CaO | 0-5 |
| ZnO | 0-6 |
| $Y_2O_3$ | 0-5 |
| $ZrO_2$ | 0-2 |
| $Li_2O$, $Na_2O$ and/or $K_2O$ | 0-1.5 |
| $As_2O_3$ and/or $Sb_2O_3$ | 0-1 |
| F and/or Cl | 0-1, | wherein the sum of $SiO_2+B_2O_3$ is 50-53, the weight ratio $SiO_2:B_2O_3$ is 0.8-1.0, the sum $SrO+BaO$ is 26-31, and the sum $ZnO+La_2O_3$ is 12-17.

10 Claims, No Drawings

OPTICAL GLASS HAVING $N_D=1.63\pm(1.5\times10^{-2})$, $V_D=59.5\pm1.0$ WITH A HIGH CHEMICAL STABILITY AND A LOW TENDENCY TO CRYSTALLIZATION

BACKGROUND OF THE INVENTION

The present invention relates to a glass having the optical characteristics $n_D=1.630\pm(1.5\cdot10^{-2})$ and $v_D=59.5\pm1.0$. Glasses having these optical characteristics are known (see for instance DE-PS No. 14 21 877 = U.S. Pat. No. 3,248,238), whose disclosures are incorporated by reference herein). However, they all contain a high percentage of BaO and consequently have very little chemical stability.

SUMMARY OF THE INVENTION

Accordingly, it is an object of this invention to provide a glass having the above mentioned optical characteristics, a good chemical stability and, at the same time, such little tendency to crystallization that it can be produced in a crucible melting batch process or in a continuous tank melting process in the form of drops, pressings, billets or glass blocks of any desired shape.

Upon further study of the specification and appended claims, further objects and advantages of this invention will become apparent to those skilled in the art.

These objects have been attained by providing an optical glass having the optical characteristics $n_D=1.63\pm(1.5\times10^{-2})$, $v_D=59.5\pm1.0$, a high chemical stability and a low tendency to crystallization, and having the following composition (in percent by weight):

|  | p | Preferred Range |
|---|---|---|
| $SiO_2$ | 23-27 | 23-27 |
| $B_2O_3$ | 24-30 | 24-30 |
| SrO | 18-31 | 18-22 |
| $La_2O_3$ | 10-16 | 10-16 |
| $Al_2O_3$ | 2-4 | 2-4 |
| BaO | 0-10 | 7-9,5 |
| CaO | 0-5 | 0-5 |
| ZnO | 0-6 | 0-6 |
| $Y_2O_3$ | 0-5 | 0 |
| $ZrO_2$ | 0-2 | 0,5-1,5 |
| $Li_2O,Na_2O$ and/or $K_2O$ | 0-1,5 | 0-1,5 |
| $As_2O_3$ and/or $Sb_2O_3$ | 0-1 | 0-1 |
| F and/or Cl | 0-1 | 0,2-0,8 | wherein the sum of the vitrifiers $SiO_2 + B_2O_3$ is 50-53, the weight ratio $SiO_2 : B_2O_3$ is 0.8-1.0 (molar ratio 1.0-1.1), the sum $SrO + BaO$ is 26-31, and the sum $ZnO + La_2O_3$ is 12-17.

DETAILED DISCUSSION

Fully conventional glassmaking procedures can be employed to prepare the glasses of this invention. Advantageously, the mentioned crucible melting batch process (for details, see, e.g. U.S. Pat. No. 3,898,093, whose disclosure is incorporated by reference herein) or the continuous tank melting process (for details, see e.g., U.S. Pat. No. 3,970,466, whose disclosure is incorporated by reference herein), is used. In this regard, reference is made to the following examples.

The glasses of this invention are particularly well adapted for conventional use in objectives for cameras, projectors and similar instruments.

The chemical stabilities, and tendencies to crystallization as measured via the standard methods, disclosed in the examples below, of the glasses of this invention, generally have values of:

|  | chemical stability | range |
|---|---|---|
| (a) | acid class, class f | better than 5c |
| (b) | erosion of $0.1\mu$ in min. in standard acetate, pH 4.5 | more than 6 min. |
| (c) | stain test class F1 | 3-4 |
| (d) | thickness of layer destroyed after 1 hour in a solution, pH 5.6 | $<0.24\mu$ |
| (e) | climatic change stability after 30 hrs | better than class 4 |
| (f) | stray light | $\leq 4.5\%$ |
|  | crystallization tendency | |
| (g) | no devitrification in the glass | |
| (h) | crystal growth rate of | $\leq 1.2\ \mu/min.$ |

Of particular importance is the attainment of the combined properties (a) through (h). It is in this sense that these properties are described as high stability and low crystallization tendency.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE I

Certain embodiments of this invention as well as three known high-barium-content glasses A, B, C are specified by way of example in the accompanying table. Indicative of the actual weight quantities of batch ingredients for each embodiment, are those given below for Example 8 of the table.

Melt Example (Example 8, see table)

| Oxides |  | weighed quantity for 120 kg of glass, in kg |  |
|---|---|---|---|
| $SiO_2$ | 24.16 | Sipur | 29.035 |
| $B_2O_3$ | 27.49 | $H_3BO_3$ | 58.386 |
| BaO | 9.06 | $Ba(NO_3)_2$ | 18.536 |
| $Na_2O$ | 1.12 | NaF | 1.833 |
| $Al_2O_3$ | 2.62 | AlO(OH) | 4.220 |
| $La_2O_3$ | 14.90 | $La_2O_3$ | 17.933 |
| $ZrO_2$ | 1.00 | $ZrO_2$ | 1.204 |
| SrO | 19.24 | $Sr(NO_3)_2$ | 47.602 |
| F | 0.68 |  |  |

| Oxide | A | B | C | 1 | 2 | 3 | 4 | 5 | 6 | 7 | 8 |
|---|---|---|---|---|---|---|---|---|---|---|---|
| $SiO_2$ | 32.50 | 29.45 | 26.42 | 23.65 | 24.00 | 25.12 | 24.00 | 24.12 | 24.28 | 25.90 | 24.16 |
| $B_2O_3$ | 16.40 | 19.30 | 23.27 | 26.92 | 27.30 | 27.45 | 27.30 | 27.45 | 27.55 | 24.30 | 27.49 |

-continued

| Oxide | A | B | C | 1 | 2 | 3 | 4 | 5 | 6 | 7 | 8 |
|---|---|---|---|---|---|---|---|---|---|---|---|
| $Li_2O$ | — | — | — | — | — | — | — | — | — | — | — |
| $Na_2O$ | 0.30 | — | 0.15 | — | — | — | — | — | — | — | 1.12 |
| $K_2O$ | — | — | 0.01 | — | — | — | — | — | — | — | — |
| MgO | — | — | — | — | — | — | — | — | — | — | — |
| CaO | — | — | — | 3.85 | — | 2.92 | — | 3.92 | — | — | — |
| SrO | — | — | 0.45 | 18.41 | 19.10 | 18.77 | 19.10 | 18.77 | 21.71 | 30.91 | 19.24 |
| BaO | 49.00 | 48.35 | 44.93 | 7.74 | 9.00 | 7.89 | 9.00 | 7.89 | 7.93 | — | 9.06 |
| ZnO | — | 0.40 | 3.44 | 4.81 | 2.00 | 3.94 | 1.00 | 2.94 | — | — | — |
| $Al_2O_3$ | 1.30 | 1.80 | 0.52 | 2.50 | 2.60 | 2.55 | 3.50 | 2.55 | 2.58 | 3.30 | 2.62 |
| $La_2O_3$ | — | 0.40 | — | 10.96 | 14.80 | 10.18 | 14.80 | 10.18 | 14.66 | 14.88 | 14.90 |
| $ZrO_2$ | — | 0.50 | — | 0.96 | 1.00 | 0.98 | 1.00 | 0.98 | 0.99 | — | 1.00 |
| $WO_3$ | — | 0.10 | — | — | — | — | — | — | — | — | — |
| $As_2O_3$ | 0.60 | 0.15 | 0.40 | 0.20 | 0.20 | 0.20 | 0.20 | 0.20 | — | 0.10 | — |
| $AlF_3$ | — | 0.05 | — | — | — | — | — | — | — | — | — |
| $(Cl')F_2$—O | — | — | — | — | — | — | 0.10 | — | 0.30 | 0.59 | 0.39 |
| F | — | — | — | — | — | — | 0.24 | — | 0.51 | 1.02 | 0.68 |
| nd | 1.6204 | 1.6204 | 1.6194 | 1.62749 | 1.6266 | 1.6212 | 1.6206 | 1.6252 | 1.6238 | 1.6210 | 1.6200 |
| vd | 60.33 | 60.33 | 60.22 | 58.50 | 59.00 | 59.10 | 59.10 | 59.50 | 59.90 | 60.00 | 60.00 |
| s | 3.619 | 3.581 | 3.563 | 3.351 | 3.382 | 3.298 | 3.357 | 3.328 | 3.377 | 3.390 | 3.363 |
| Acid Resistance - class f | 5c | 5b/c | 5c | 5b/c | 5b | 5b | 5b | 5b | 5b | 5b | 5b |
| Erosion in mins up to $0.1\mu$ | 4.1 | 5.4 | 1.5 | 5.2 | 9.8 | 7 | 10.8 | 6 | 9.8 | 7.3 | 8.9 |
| Stain class F1 | 5 | 4 | 4 | 4 | 4 | 4 | 3 | 3 | 4 | 4 | 3 |
| Layer thickness in $\mu$ destroyed after 1 hr. in Soln. I pH 4.6 | 12'/0.18 | — | — | — | — | — | — | — | — | — | — |
| in Soln. II pH 5.6 | — | 0.26 | 0.24 | 0.17 | 0.17 | 0.18 | 0.16 | 0.16 | 0.17 | 0.24 | 0.18 |
| Climatic change stability after 30 hrs. | 4 | 3 | 4 | 3 | 3 | 3 | 3 | 3 | 3 | 3 | 3 |
| Stray Light | 8.6 | 4.6 | 9.5 | 3.4 | 3.6 | 3.0 | 3.6 | 3.4 | 3.4 | 4.5 | 3.9 |

Each of the well mixed batches is introduced at 1300°–1350° C. into a 50 liter Pt-crucible, then heated up to 1370° C. and refined for approximately 5 hrs until bubble-free. The melt is then left to stand at 1300° C. and, at approximately 1150° C., run through a discharge pipe into pre-heated metal molds of the desired form to make billets. Alternatively, the melt is pressed to make drops or pressings. Using a suitable Zac-stone tank it is also possible to produce a melt of the above specified compositions continuously. This can also be processed into billets, drops and pressings as required.

EXAMPLE II (see Example 5 of the table)

The following describes by way of example an analysis of a glass according to this invention.

| Composition (in weight percent): | |
|---|---|
| $SiO_2$ | 24.12 |
| $B_2O_3$ | 27.45 |
| CaO | 3.92 |
| SrO | 18.77 |
| BaO | 7.89 |
| ZnO | 2.94 |
| $La_2O_3$ | 11.18 |
| $Al_2O_3$ | 2.55 |
| $ZrO_2$ | 0.98 |
| $As_2O_3$ | 0.20 |
| $n_D$ | 1.6252 |
| $v_D$ | 59.5 |

This glass has the following properties:

| | |
|---|---|
| coefficient of expansion $\alpha$ $10^7/°C$. between 20–300° C. | 71 |
| transformation temperature $T_g$ (°C.) | 642 |
| fusing temperature EW (°C.) at $10^{7.65}$ d Pa.s | 739 |
| specific gravity s | 3.328 |
| acid class class f | 5b |
| erosion of $0.1\mu$ in min. in standard acetate, pH 4.5 | 6 |
| stain test class F1 | 4 |
| thickness of layer destroyed after 1 hour in a solution, pH 5.6 | $0.16\mu$ |
| climatic change stability | 3. |

The chemical stability (tested by standard acid resistance-staining and climatic change stability tests as described, for example, in Schott pocket catalogue No. 3050, (1972)) is one class better than that of currently available conventional glasses having these optical characteristics.

The crystallization test (O. H. Grauer and E. H. Hamilton: Improved Apparatus for Determination of Liquidus Temperatures and Rates of Crystal Growth in Glasses; *J. Research Natl. Bur. Standards*, 44 (5), 495–502 (1950), RP 2096), after tempering for 60 minutes in a gradient furnace, shows no devitrification in the glass, and on the surface, minor surface crystals at 915° C. (corresponding to $1.4\times10^3$d Pa.s), with a crystal growth rate of 0.1 $\mu$/min.

EXAMPLE III (see Example 8 of the table)

| Composition in weight percent. | |
|---|---|
| $SiO_2$ | 24.16 |

-continued

| Composition in weight percent. | |
|---|---|
| $B_2O_3$ | 27.49 |
| $Na_2O$ | 1.12 |
| SrO | 19.24 |
| BaO | 9.06 |
| $Al_2O_3$ | 2.62 |
| $La_2O_3$ | 14.90 |
| $ZrO_2$ | 1.00 |
| F | 0.68 |
| $n_D$ | 1.6200 |
| $v_D$ | 60.02 |
| $\alpha.10^7/°C.$ (20–300° C.) | 71 |
| Tg (°C.) | 628 |
| EW (°C.) | 730 |
| s | 3.363 |
| f class | 5b |
| erosion of 0.1μ in min. in standard acetate, pH 4.6 | 8.9 |
| F1 Class | 3 |
| Layer thickness in μ destroyed after 1 hr in solution at pH 4.6 | 0.18 |
| Climatic change stability | 3 |

The crystallization test after 60 minutes showed no devitrification in the glass, minor devitrification at the surface at 970° C. (corresponding to 250 dPa.s), and a crystal growth rate of 1.2 μ/min.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical glass having $n_D=1.63\pm(1.5\times10^{-2})$, $v_D=59.5\pm1.0$, a high chemical stability and a low tendency to crystallization, and consisting of (in percent. by weight):

| $SiO_2$ | 23–27 |
|---|---|
| $B_2O_3$ | 24–30 |
| SrO | 18–31 |
| $La_2O_3$ | 10–16 |
| $Al_2O_3$ | 2–4 |
| BaO | 0–10 |
| CaO | 0–5 |
| ZnO | 0–6 |
| $Y_2O_3$ | 0–5 |
| $ZrO_2$ | 0–2 |
| $Li_2O$, $Na_2O$ and/or $K_2O$ | 0–1.5 |
| $As_2O_3$ and/or $Sb_2O_3$ | 0–1 |
| F and/or Cl | 0–1, |
| wherein the sum of $SiO_2 + B_2O_3$ is | 50–53, |
| the weight ratio $SiO_2:B_2O_3$ is | 0.8–1.0, |
| the sum SrO + BaO is | 26–31, |
| and the sum ZnO + $La_2O_3$ is | 12–17. |

2. An optical glass of claim 1 having the following properties:

| | | range |
|---|---|---|
| | chemical stability | |
| (a) | acid class, class f | better than 5c |
| (b) | erosion of 0.1μ in min. in standard acetate, pH 4.5 | more than 6 min. |
| (c) | stain test class F1 | 3–4 |
| (d) | thickness of layer destroyed after 1 hour in a solution, pH 5.6 | <0.24 |
| (e) | climatic change stability after 30 hrs | better than class 4 |
| (f) | stray light | ≦4.5% |
| | crystallization tendency | |
| (g) | essentially no devitrification | |
| (h) | crystal growth rate of | ≦1.2 μ/min. |

3. An optical glass of claim 1 having the following property:
acid class, class f: better than 5c.

4. An optical glass of claim 1 having the following property:
erosion of 0.1μ m in min. in standard acetate, pH 4.5.: more than 6 min.

5. An optical glass of claim 1 having the following property:
stain test class Fl: 3–4.

6. An optical glass of claim 1 having the following property:
thickness of layer destroyed after 1 hour in a solution, pH 5.6: <0.24.

7. An optical glass of claim 1 having the following property:
climatic change stability after 30 hours: better than class 4.

8. An optical glass of claim 1 having the following property:
stray light: ≦4.5%.

9. An optical glass of claim 1 having essentially no devitrification.

10. An optical glass of claim 1 having a crystal growth rate of ≦1.2 μ/min.

* * * * *